Oct. 1, 1968    J. K. BAILEY    3,403,951
BEARING WITH ROLLING ELEMENTS AND A RETAINER THEREFOR
Filed April 10, 1967    3 Sheets-Sheet 3
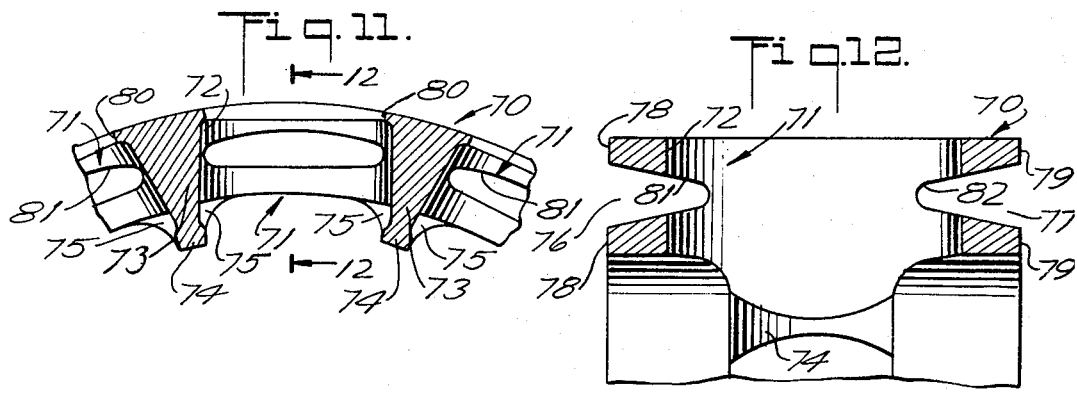
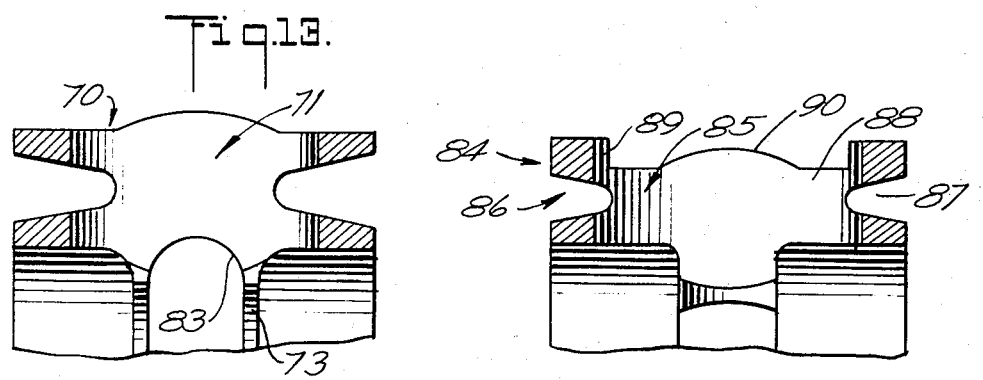
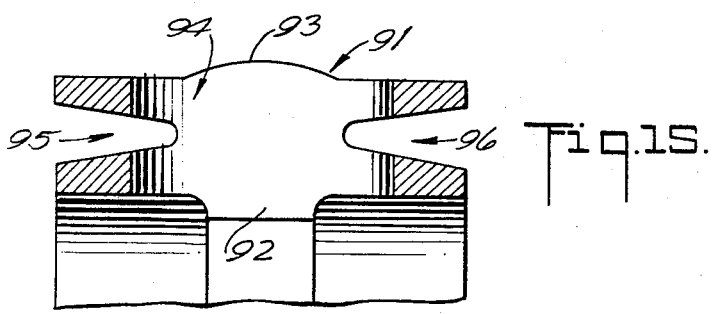
INVENTOR.
JOSEPH K. BAILEY
BY
George C. Bower
ATTORNEY United States Patent Office 3,403,951
Patented Oct. 1, 1968

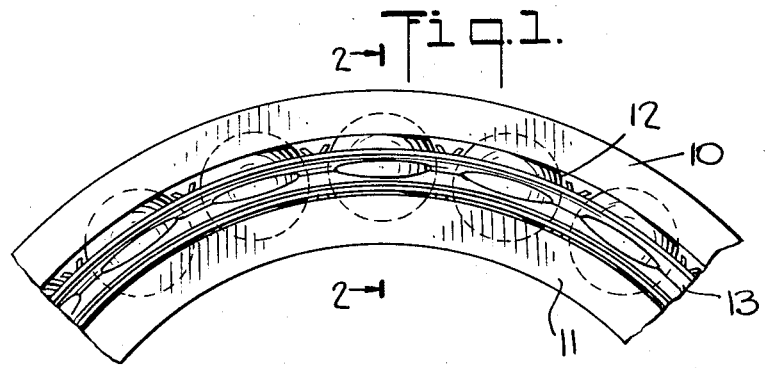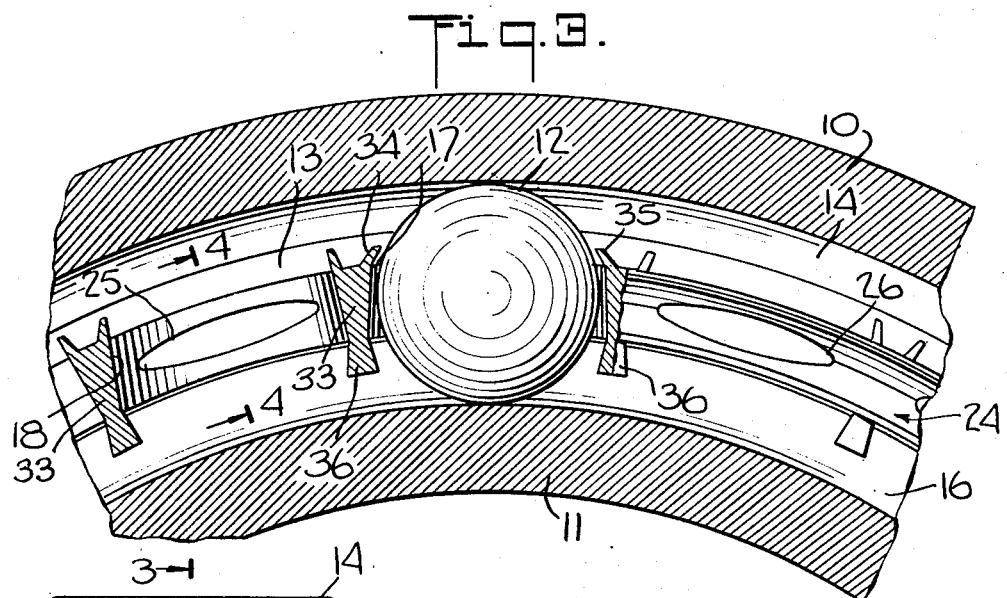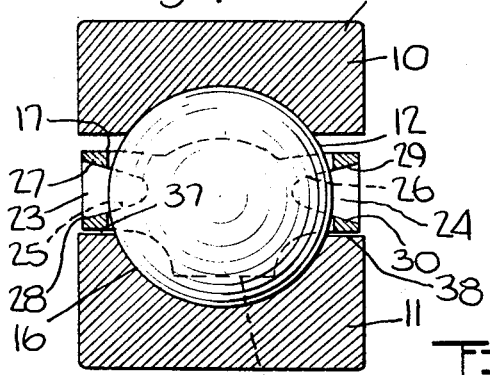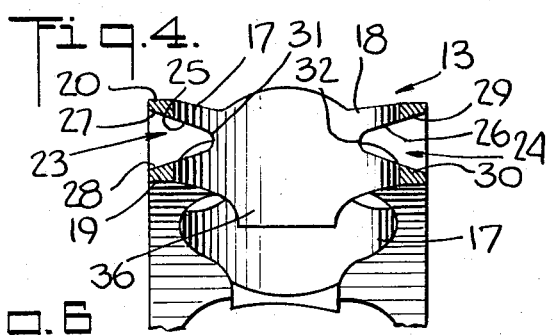

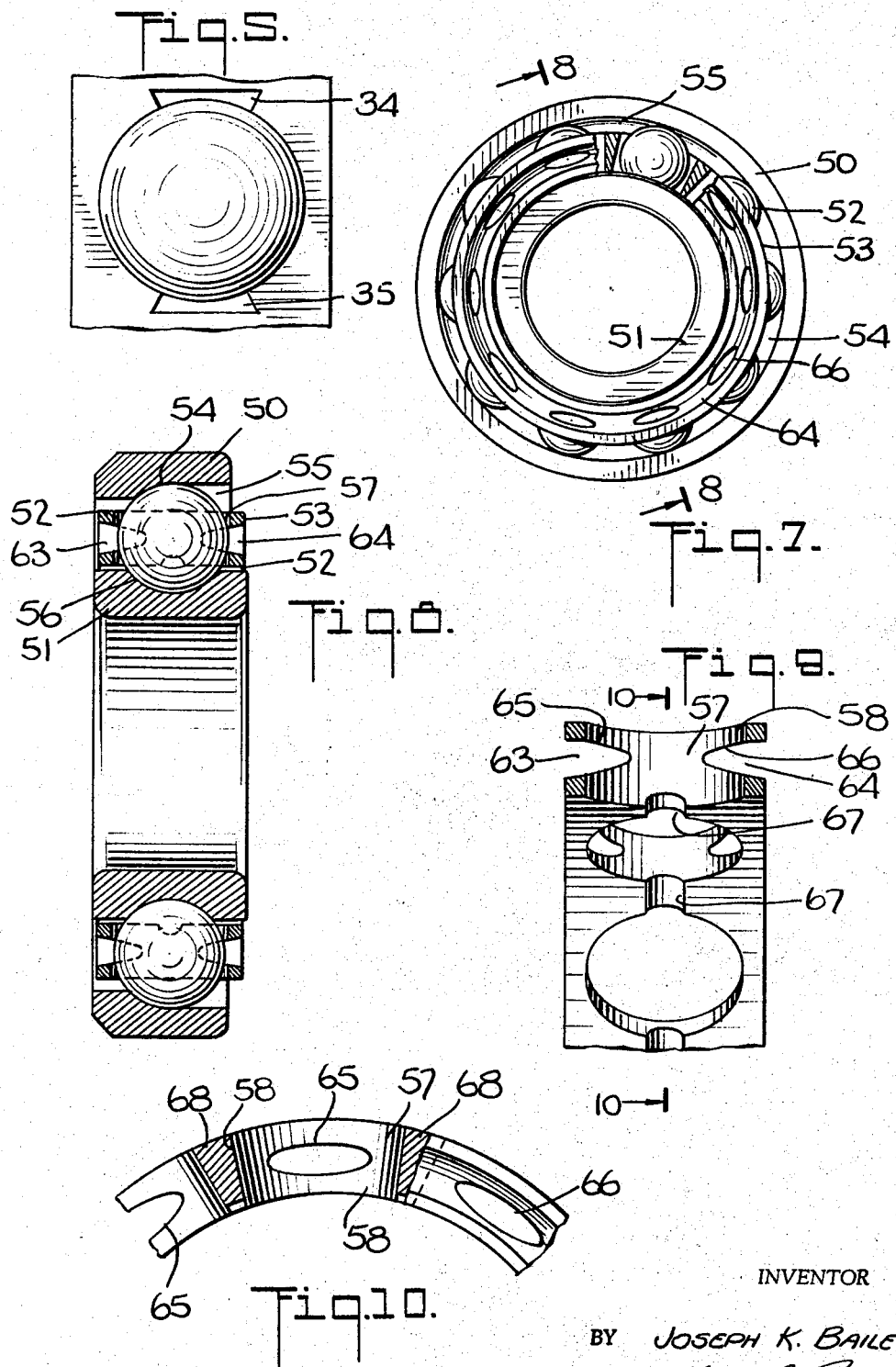

3,403,951
BEARING WITH ROLLING ELEMENTS AND
A RETAINER THEREFOR
Joseph Kenneth Bailey, Lakewood, N.Y., assignor to
TRW Inc., Euclid, Ohio, a corporation of Ohio
Continuation-in-part of application Ser. No. 404,591, Oct.
19, 1964. This application Apr. 10, 1967, Ser. No.
633,662
5 Claims. (Cl. 308—201)

ABSTRACT OF THE DISCLOSURE

Ball bearings are described having inner and outer rings with a retainer therebetween for spacing the bearing balls. The rings have races for the balls. The retainers may be made from a single piece or may be made in two pieces and riveted together. The retainers have circular pockets for the balls. Extending inwardly from the sides of the retainer are circumferentially extending V-shaped grooves which intersect with the pockets. Grooves may also be provided in the inner and outer surfaces of the bridge portions between the pockets. These grooves are unobstructed and provide for the flow of lubricant through the pockets.

Related application

This is a continuation-in-part of my now abandoned application Ser. No. 404,591 filed on Oct. 19, 1964, and entitled "Bearing With Rolling Elements and a Retainer Therefor."

Background of the invention

In prior bearings the retainer is usually a single piece machined to provide ball pockets. The retainers are usually solid except for these pockets. Grooves have been provided in the outer and inner surfaces to assist in the flow of lubricant through the pockets. Retainers stamped from sheet metal and bent into a circular shape have been made. Some of these retainers have grooves extending in axially to intersect with the pockets.

Summary of the invention

The invention is directed particularly to providing single piece retainers for ball or roller bearings with a means for flowing lubricant through the pockets. If the lubricant becomes entrapped in the pocket or flows through slowly a churning action occurs.

An object of the invention is to provide a rolling element bearing with a retainer that has a minimum weight and permits a free flow of lubricant.

Another object of the invention is to provide a rolling element bearing with a retainer having means for readily flowing lubricant through the pockets.

Another object of the invention is to provide a retainer for ball or roller bearings that is inexpensive to manufacture and is light in weight and permits the flow of lubricant.

Other and further objects and advantages will be apparent from the following description set forth in connection with the drawings.

Brief description of the drawings

FIG. 1 is a fragmentary side view of a ball bearing.
FIG. 2 is a sectional view taken along lines 2—2 of FIG. 1.
FIG. 3 is a fragmentary enlarged side view of the bearing taken along lines 3—3 of FIG. 2.
FIG. 4 is a fragmentary sectional view of the retainer taken along lines 4—4 of FIG. 3.
FIG. 5 is a fragmentary top view of the retainer illustrating a single pocket.
FIG. 6 is a modification of the embodiment of FIG. 1.
FIG. 7 is a side view of another embodiment of the bearing with a portion of the retainer shown in section through a center radial plane.
FIG. 8 is a sectional view of the bearing taken along lines 8—8 of FIG. 7.
FIG. 9 is a fragmentary sectional view of the retainer taken along lines 8—8 of FIG. 7.
FIG. 10 is a fragmentary sectional view of the retainer taken along lines 10—10 of FIG. 9.
FIG. 11 is a fragmentary sectional view of another embodiment of the retainer with the sectional taken along lines corresponding to lines 10—10 of FIG. 9.
FIG. 12 is a sectional view of the retainer taken along lines 12—12 of FIG. 11.
FIGS. 13 to 15 are sectional views of other embodiments of the retainer taken along sectional lines similar to lines 12—12 of FIG. 11.

Detailed description

Referring to FIGS. 1 and 2, a ball bearing is shown comprising an outer ring 10, an inner ring 11 and bearing balls 12 held in circumferential spaced relation by a retainer 13. The outer ring 10 has a race 14. The inner ring has a race 16. The balls 12 are evenly spaced by the retainer 13 concentrically positioned to the rings 10 and 11.

As illustrated in FIGS. 3 and 4, the retainer 13 has openings or pockets 17 receiving a respective ball. The pockets 17 are formed by cylindrical walls 18 with axes extending radially through the center of the bearing. The walls 18 extend through the retainer from the inner cylindrical wall 19 to the outer cylindrical wall 20.

On each side of the retainer are circumferentially continuous grooves 23, 24 concentric to the axis of the bearing. The grooves extend axially into the retainer and intersect with the pockets 17 forming openings 25 and 26 with the cylindrical walls 18. The grooves 23, 24 are V-shaped and each extends approximately one-quarter the axial width of the retainer. The walls 27 and 29 form outer triangular-shaped edge portions with the outer wall 20, and the walls 28 and 30 form inner triangular-shaped edge portions with the inner wall 19. The walls 27, 28 and 29, 30 forming the grooves 23, 24, respectively, extend continuously and circumferentially and are sloped at an angle to the axis of the bearing imparting the V-shaped cross section. The grooves have fillet or rounded bottom walls 31, 32 respectively. The grooves extend inwardly and axially a substantial distance to intersect with the oval or elliptical shaped openings 25, 26. The openings have a substantial width and length. The grooves and openings are unobstructed permitting the free flow of lubricant therethrough.

Between the pockets 17 and the grooves 23, 24 are web or bridge portions 33. The circumferentially extending edge portions interconnect the bridge portions. On the outer surface of the retainer are lugs or projections 34, 35 on opposite sides of each pocket bent over before insertion of the ball 12 for holding the balls in the retainer during assembly. In the embodiment of FIGS. 1 and 2 the web or connecting portions have inwardly extending retaining projections 36 of expanding width towards the center of the bearing to reduce the diameter of the pocket to less than the diameter of the bearing ball. The bearing balls are snapped into the pockets from the outside diameter. However, in other embodiments the bearing balls may be snapped in from the inside diameter.

In this embodiment the inner ring 11 is the pilot ring and has circumferential surfaces 37, 38 in close proximity to the inner surface 19 on the retainer. The projections 36 extend into the groove formed by the curved race 16. The outer ring 10 is spaced from the retainer 13 as illustrated.

The grooves 23 and 24 are in communication with the pockets 17 by means of the openings 25 and 26. Lubricant can thus flow with substantial ease from the pocket through the openings to the exterior of the bearing or in a reverse direction from the exterior of the bearing through the grooves and openings into the pockets. Also, lubricant may flow between the retainer and the outer ring. Thus a circulating path is provided through the pocket for continuously supplying and removing lubricant. This provides a continuous and adequate supply of lubricant to the ball and race surfaces and prevents the build-up of lubricant in the working portions of the bearing. The operating temperature is thus maintained at a lower level and excessive initial break-in temperatures are avoided. The life of the bearing is substantially extended by the lower temperatures and increased lubrication.

In the modification illustrated in FIG. 6 grooves 39, 40 are provided in the web portions 33 at opposite ends of projections 36 when grinding relief is required.

Another embodiment of the invention is illustrated in FIGS. 7 to 10 with an outer ring 50, inner ring 51 and bearing balls 52 held in circumferential spaced relation by a retainer 53. The outer ring has a race 54 and the inner ring has a race 56. The retainer 53 is concentrically positioned relative to the rings 50 and 51 with the ring 51 functioning as the pilot ring for rotating the retainer. The outer ring 50 has a continuous circumferential notch or groove 55 extending outwardly from the race 54 for insertion of the balls into the race.

The retainer has openings or pockets 57 for the bearing balls 52. The pockets are formed by cylindrical walls 58 concentric to a radial axis. On each side are grooves 63, 64 similar to grooves 23, 24 of the embodiment of FIG. 1. The grooves 63, 64 intersect the pockets to form openings 65, 66. On the inner surface of the retainer facing the piloting inner ring are channel segments 67 in the webs or connecting portions 68 connecting the pockets 57. The channel segments are circular in cross section and have a diameter substantially less than the diameter of the pockets. This channel provides an additional path for the flow of lubricant through the bearing.

In FIGS. 11 and 12 another embodiment of the invention is illustrated in which the retainer 70 is a single piece of metal and has pockets 71 formed by cylindrical walls 72. The pockets are separated by web or bridge portions 73 having a generally triangular cross-sectional shape and on the inner portions inwardly extending retaining projections 74. The projections 74 circumferentially expand the retainers 70 which have a spacing less than the diameter of the pockets 71 so as to hold ball bearings in the pocket 71. The cylindrical wall 80 forms a circumferential lip which retains the bearing balls while permitting the balls to be snapped into the pockets. The projecting portions 74 have flared portions 75 merging with the bottom of the retainer as illustrated. The V-shaped grooves 76, 77 extend inwardly from the sides 78, 79 of the retainer to intersect with the walls 72 of the pocket and form openings 81, 82. The grooves 76 and 77 are directly connected to pockets 71. Thus the lubricant can flow through the pockets and grooves. The pockets have a depth which is approximately one-quarter of the axial width of the retainer.

In the embodiment of FIG. 13 the bridge portions 73 have channels 83 formed therein to interconnect the pockets on the inside of the retainer. This permits flow of lubricant from pocket to pocket.

In FIG. 14 the retainer 84 has pockets 85 intersected by the grooves 86, 87 on each side of the retainer. The grooves have a depth extending axially about one-seventh of the axial width of the retainer. The bridge portions 88 on the outer surface of the retainer have channels 89 interconnecting the pockets. Retaining projections 90 are provided on the outer surface of the bridge portions.

In the embodiment of FIG. 15 the retainer 91 has inner and outer projections 92, 93 for holding the bearing balls in the pockets 94 and has circumferential grooves 95, 96 extending axially to intersect with the pockets. The grooves extend axially a depth approximately one-third the axial width of the retainer.

The grooves 23, 24 or 63, 64 and the channel segments 67 not only improve the lubrication of the bearing but also lighten the retainer. In each of these embodiments the retainers may be made of brass, steel, plastic or other suitable retainer material and the rings and bearing balls are made of steel or other suitable material. The grooves and channel segments reduce the amount of material in the retainer without sacrifice of the strength of the retainer or its ability to retain its shape. Since the retainer is a dynamic component, reduction of its weight is desirable where mass may be undesirable in view of acceleration and deceleration and in the case of bearings operated at high speeds. In each of the described embodiments the inner ring is the pilot ring. It is, of course, understood that retainers embodying the invention could be used in bearings with outer pilot rings. The bearings and retainers, therefore, are illustrated in proportional relationship to the actual bearings as designed.

Although the invention has been described in connection with ball bearings, it may also be used in connection with roller bearings by making the pockets of a rectangular shape. The side grooves would then intersect the pocket to form a rectangular-shaped opening.

Various other modifications and changes may be made in the foregoing embodiments without departing from the invention as set forth in the appended claims.

I claim:

1. In a radial type bearing having inner and outer rings with bearing balls in rolling engagement therewith, a single piece ring-shaped retainer connected to and positioned between said inner and outer rings in piloting relation with one of said rings, exterior side walls and inner generally cylindricallly-shaped radially extending walls forming pockets spaced around said retainer for receiving said bearing balls, solid bridge portions between adjacent pockets to maintain said bearing balls in proper circumferential relation, V-shaped walls forming V-shaped grooves extending circumferentially and axially inward from said exterior side walls forming inner and outer generally triangular-shaped edge portions extending circumferentially around said retainer and circumferentially interconnecting said solid bridge portions, said V-shaped walls extending to intersect said cylindrical walls and form elliptically-shaped openings in said pocket walls narrowing in width at each end towards said bridge portions to provide generally cylindrically-shaped areas on said bridge portions of said inner pocket walls for engagement by said bearing balls, said pockets, openings and grooves forming a clear unobstructed lubricant flow path for circulating flowing lubricant through said pockets.

2. In a radial type bearing as set forth in claim 1 wherein said solid bridge portions have inner and outer projections to hold said bearing balls in said pockets of said retainer.

3. In a radial type bearing as set forth in claim 1 wherein said solid bridge portions have circumferentially extending channels on the inner side connecting adjacent pockets for the circulation of lubricant.

4. In a radial type bearing as set forth in claim 2 wherein said inner projections have channels interconnecting said pockets for the circulation of lubricant.

5. In a radial type bearing as set forth in claim 1 wherein said bridge portions have exterior channels extending between said pockets for the circulation of lubricant.

References Cited

UNITED STATES PATENTS

| 2,838,348 | 6/1958 | Hamm | 308—201 |
| 2,987,350 | 6/1961 | Hay | 308—201 |

FOREIGN PATENTS

| 282,637 | 3/1927 | Germany. |
| 852,128 | 10/1939 | France. |
| 437,246 | 4/1912 | France. |

MARTIN P. SCHWADRON, *Primary Examiner.*

FRANK SUSKO, *Assistant Examiner.*